(12) United States Patent
Minami

(10) Patent No.: US 8,760,602 B2
(45) Date of Patent: Jun. 24, 2014

(54) BACKLIGHT DEVICE AND LIQUID CRYSTAL DISPLAY CONFIGURED FOR UNIFORM LIGHT DISTRIBUTION THROUGH REFLECTION

(76) Inventor: Masaru Minami, Kanagawa (JP)

( * ) Notice: Subject to any disclaimer, the term of this patent is extended or adjusted under 35 U.S.C. 154(b) by 285 days.

(21) Appl. No.: 11/382,099

(22) Filed: May 8, 2006

(65) Prior Publication Data

US 2006/0256255 A1    Nov. 16, 2006

(30) Foreign Application Priority Data

May 11, 2005  (JP) ................................ P2005-138661

(51) Int. Cl.
*G02F 1/1335*  (2006.01)
*F21V 7/04*  (2006.01)

(52) U.S. Cl.
USPC .................. 349/65; 349/62; 349/64; 349/67; 362/606; 362/607; 362/608; 362/609; 362/612; 362/618; 362/619; 362/622; 362/624; 362/625

(58) Field of Classification Search
USPC .................. 349/65–67, 62, 64; 362/606–629
See application file for complete search history.

(56) References Cited

U.S. PATENT DOCUMENTS

| | | | | |
|---|---|---|---|---|
| 4,573,766 A | * | 3/1986 | Bournay et al. | 349/65 |
| 4,673,918 A | * | 6/1987 | Adler et al. | 341/13 |
| 5,379,080 A | * | 1/1995 | Onozuka | 353/37 |
| 5,833,517 A | * | 11/1998 | Konda et al. | 451/29 |
| 5,926,601 A | * | 7/1999 | Tai et al. | 385/146 |
| 6,285,426 B1 | * | 9/2001 | Akins et al. | 349/114 |
| 6,347,874 B1 | * | 2/2002 | Boyd et al. | 362/628 |

(Continued)

FOREIGN PATENT DOCUMENTS

| | | |
|---|---|---|
| JP | 08-136917 | 5/1996 |
| JP | 2002-324409 | 11/2002 |

(Continued)

OTHER PUBLICATIONS

Japanese Office Action issued on Feb. 2, 2010 in connection with corresponding JP Appl. No. 2005-138661.

*Primary Examiner* — Lucy Chien
*Assistant Examiner* — Paisley L Arendt
(74) *Attorney, Agent, or Firm* — Sheridan Ross P.C.

(57) ABSTRACT

A direct backlight device including a light source arranged on the rear surface of a light-guiding plate and a liquid crystal display apparatus including the backlight device are provided, in which light extracting efficiency from the light-guiding plate is improved and luminance can be prevented from lowering or can be improved. The backlight device includes a light source arranged on the rear surface opposite to a light-emitting surface, and a reflective-angle modified portion, for example, a concave-convex portion formed by sandblast to modify a reflective angle of light emitted from the light source is provided at least on the light-emitting surface and/or the rear surface. A light reflective angle equal to or smaller than the critical angle is modified to improve the light extracting efficiency from the light-emitting surface.

19 Claims, 4 Drawing Sheets

(56) References Cited

U.S. PATENT DOCUMENTS

| | | | |
|---|---|---|---|
| 6,404,131 B1* | 6/2002 | Kawano et al. | 315/82 |
| 6,542,207 B1* | 4/2003 | Yoshizawa | 349/69 |
| 6,561,663 B2* | 5/2003 | Adachi et al. | 362/616 |
| 6,665,029 B2* | 12/2003 | Kondo et al. | 349/113 |
| 7,021,813 B2* | 4/2006 | Lee et al. | 362/609 |
| 7,064,741 B2* | 6/2006 | Katsu et al. | 345/102 |
| 7,172,324 B2* | 2/2007 | Wu et al. | 362/559 |
| 7,708,444 B2* | 5/2010 | Sakai et al. | 362/615 |
| 2002/0097354 A1* | 7/2002 | Greiner | 349/61 |
| 2004/0135936 A1* | 7/2004 | Lee | 349/64 |
| 2005/0174806 A1* | 8/2005 | Sakai et al. | 362/615 |

FOREIGN PATENT DOCUMENTS

| | | |
|---|---|---|
| JP | 2003-151337 | 5/2003 |
| JP | 2003-215350 | 7/2003 |
| JP | 2004-022344 | 1/2004 |
| JP | 2004-265646 | 9/2004 |

* cited by examiner

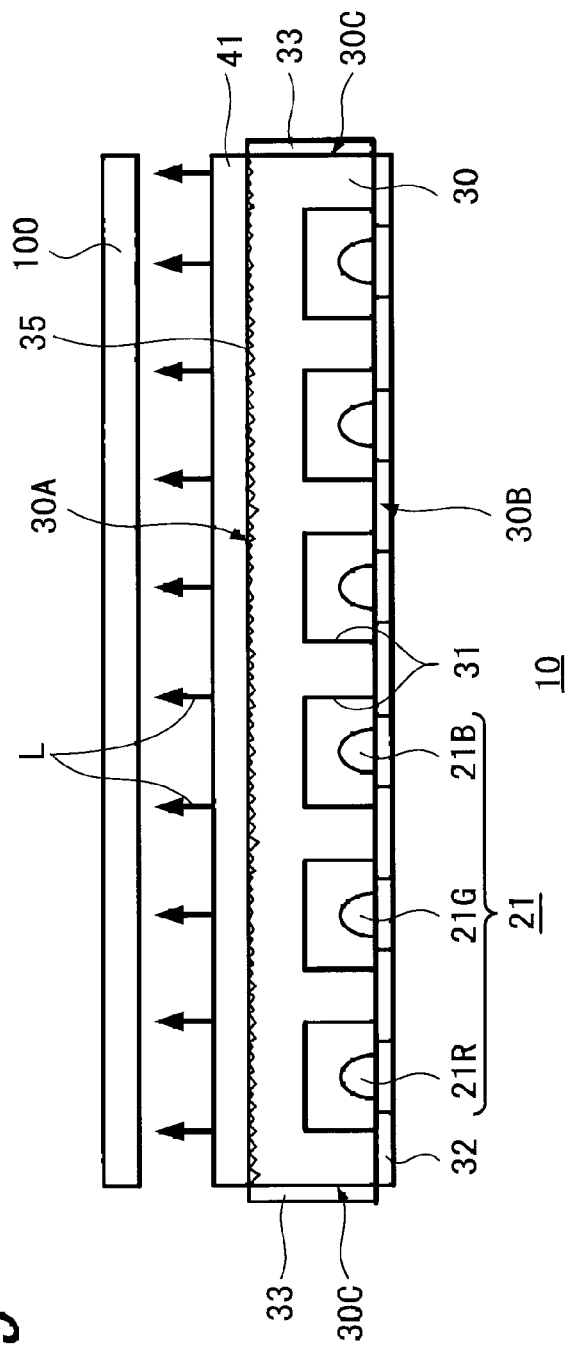
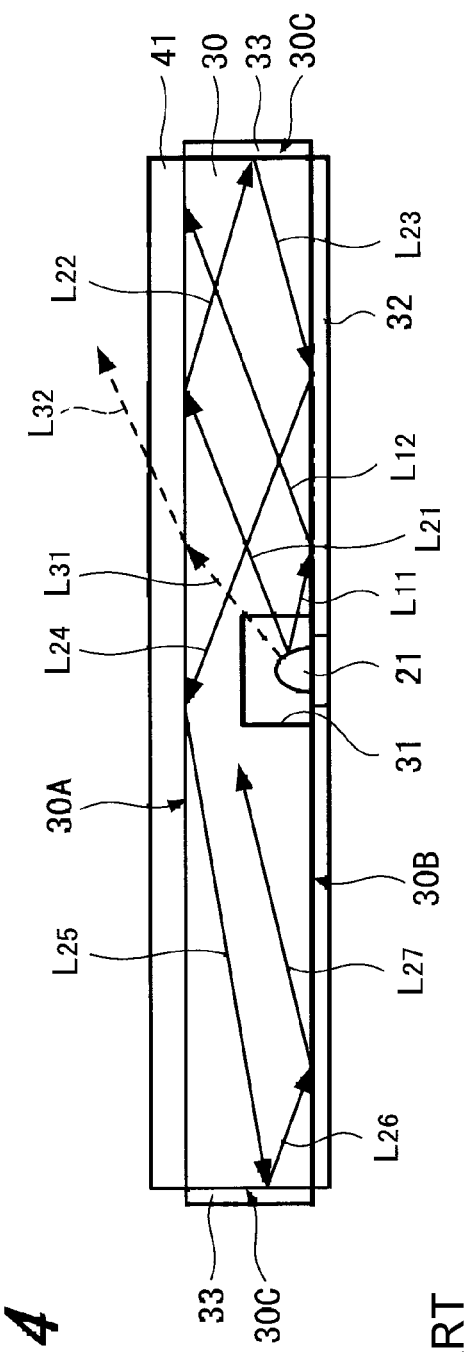
FIG. 3
FIG. 4
PRIOR ART

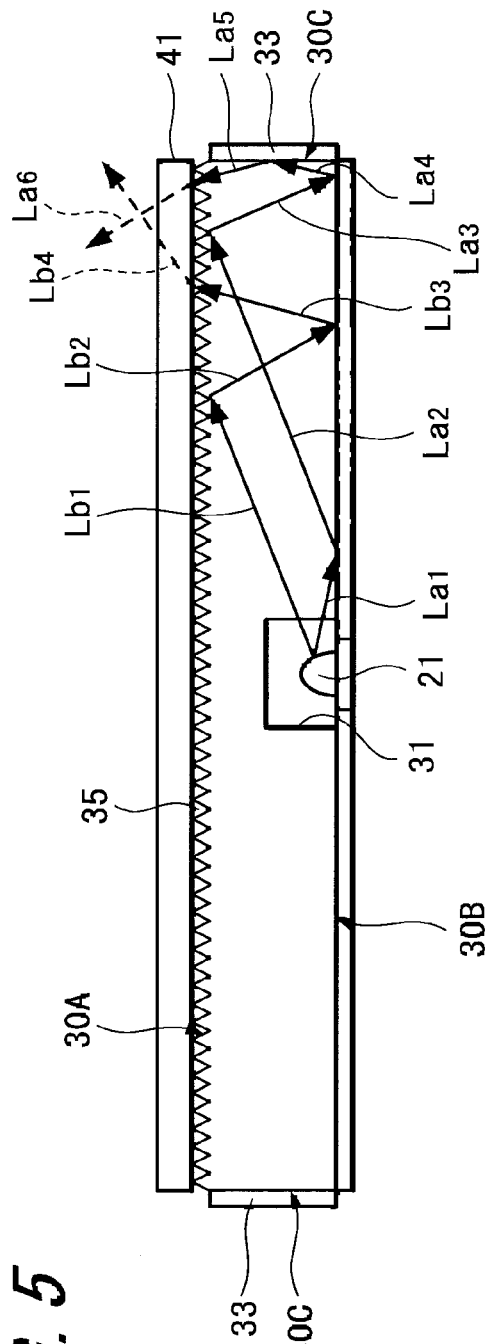
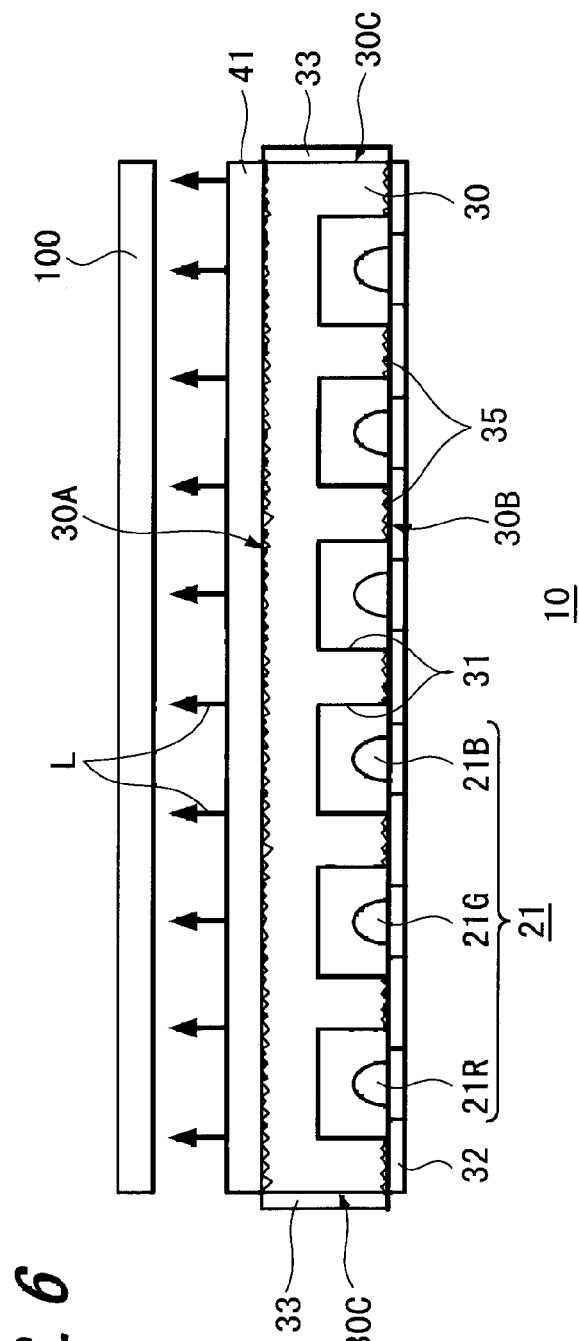
FIG. 5
FIG. 6

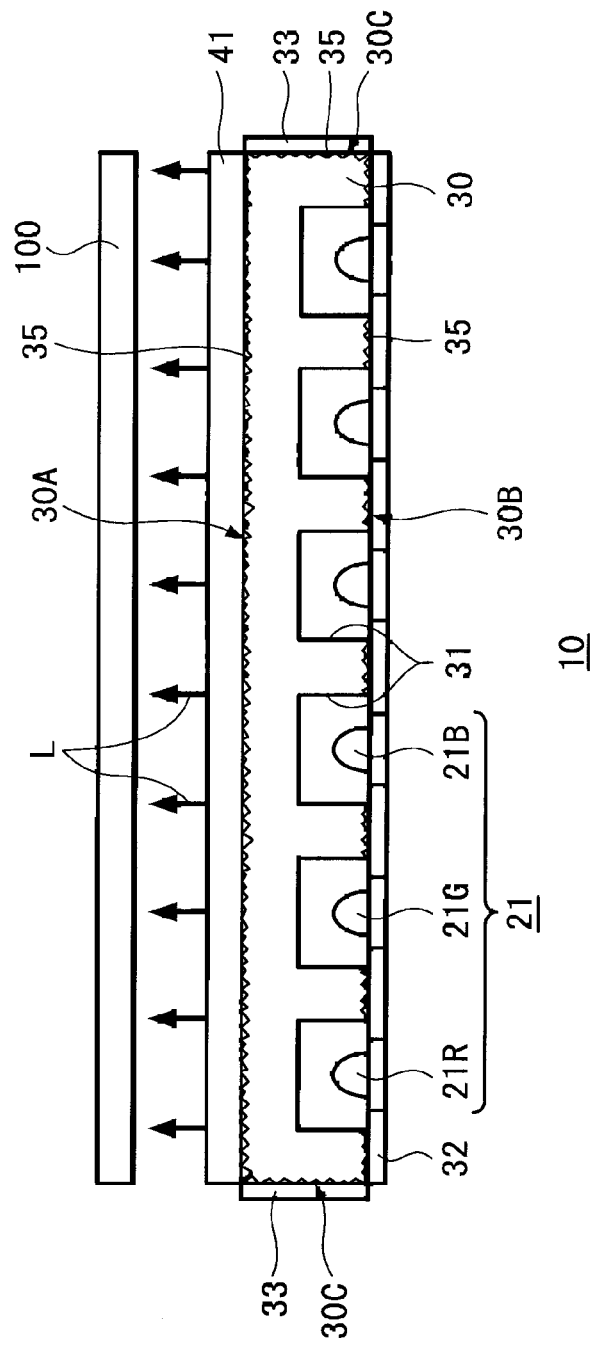

BACKLIGHT DEVICE AND LIQUID CRYSTAL DISPLAY CONFIGURED FOR UNIFORM LIGHT DISTRIBUTION THROUGH REFLECTION

CROSS REFERENCES TO RELATED APPLICATIONS

The present invention contains subject matter related to Japanese Patent Application JP 2005-138661 filed in the Japanese Patent Office on May 11, 2005, the entire contents of which being incorporated herein by reference.

BACKGROUND OF THE INVENTION

1. Field of the Invention

The present invention relates to a backlight device particularly suitable for being applied to a transmissive liquid crystal display apparatus, and to a liquid crystal display apparatus.

2. Description of the Related Art

Recently, a considerably thin display device such as an LCD (Liquid Crystal Display), PDP (Plasma Display Panel) and the like is proposed to be commercially available as the display device replacing a CRT (Cathode Ray Tube) for a television receiver. Particularly, since an LCD apparatus using an LCD panel is capable of being driven by low power consumption and a large-sized LCD panel has become capable of being manufactured at low costs, the LCD apparatus using an LCD panel is widely used and the technical research and development is advanced.

The above LCD apparatus mainly uses a backlight system in which a color image is displayed by a backlight device that illuminates from the rear side the whole rear surface of the transmissive LCD panel including a color filter.

A CCFL (Cold Cathode Fluorescent Lamp) which emits white light by using a fluorescent tube and an LED (Light Emitting Diode) are considered to be promising as a light source of the backlight device (refer to Patent Reference 1, for example).

Particularly, with development of a blue LED, respective LEDs of emitting red light, green light and blue light that are three primary colors in light are prepared, and white light with high color purity can be obtained by mixing red light, green light and blue light emitted therefrom. Therefore, with those LEDs being a light source of the backlight device, color purity through an LCD panel becomes high and so color reproduction range can be greatly expanded in comparison with the range of a CCFL. Further, luminance of the backlight device can greatly be improved by using an LED chip of high power.

As described above, in the case where an LED is used as a light source of a backlight device, when the LED is arranged directly under a light-emitting surface, namely, when a direct type LED is employed, uneven luminance and uneven chrominance may be caused, because the LED is a point source of light.

As a method to solve the above problem, it is conceivable to enlarge the distance between the LED and a diffusion plate. However, if the distance is enlarged, the thickness of the backlight may be extremely large in comparison with the backlight using a CCFL. It is desirable for an LCD apparatus to be further lightweight and shaped thin, and so it is also desirable for the backlight to be thinner.

Then, as a method to reduce the thickness, a structure is proposed in which a light-guiding plate is used to reflect light emitted from a light source arranged at a part of the plate multiple times so that a surface light source is obtained.

In the structure, a critical angle formed by the difference in refractive index between the light-guiding plate and air around the plate is used to confine light with an incident angle larger than the critical angle, thereby making light uniform. Typically, a reflective film or diffuse reflective sheet is formed covering the surface of the light-guiding plate to improve efficiency in using light.

[Patent Reference 1] Japanese Published Patent Application No. H8-136917

[Patent Reference 2] Japanese Published Patent Application No. 2004-265646

SUMMARY OF THE INVENTION

However, in the case where such reflective film and diffuse reflective sheet as described above made of materials different from that of a light-guiding plate are provided on the surface of the light-guiding plate, difference in refractive index between the light-guiding plate and those material films may cause interfacial reflection. When the light-guiding plate is formed of parallel planes constituting a rectangular parallelepiped, a light reflective angle is not modified in the light-guiding plate, and so part of light emitted from a light source may not be emitted from the light-guiding plate, which reduces efficiency in using light.

A backlight device of what is called a sidelight type, in which a light source is arranged on one side surface of the light-guiding plate, includes a light scattering structure provided in a dark area of light emitted from the light source on the front or rear surface of the light-guiding plate (refer to Patent Reference 2, for example).

However, even if the above structure is applied to the backlight device of a direct type in which the light source is arranged on the rear surface side, it is difficult to improve light extracting efficiency.

In light of the above-described problems, it is desirable to provide a direct backlight device with a light source arranged on the rear surface of a light-guiding plate, in which light extracting efficiency of the light-guiding plate is improved and luminance is controlled or improved, and to provide a liquid crystal display apparatus including the backlight device.

A backlight device according to an embodiment of the present invention includes a light source arranged on the rear surface opposite to a light-emitting surface of a light-guiding plate, in which a reflective-angle modified portion that modifies the reflective angle of light emitted from the light source is provided at least on the light-emitting surface and/or the rear surface of the light-guiding plate.

Further, in the backlight device according to an embodiment of the present invention, the reflective-angle modified portion is formed of a concave-convex portion made by sandblast, various kinds of etching or the like, for example.

Furthermore, a liquid crystal display apparatus according to an embodiment of the present invention includes: a transmissive LCD panel and a backlight device illuminating the transmissive LCD panel from the rear surface side, in which the backlight device according to an embodiment of the present invention is used.

As described above, in the backlight device according to an embodiment of the present invention, the reflective-angle modified portion having the function of modifying a reflective angle of light emitted from a light source and formed of, for example, the concave-convex portion is provided on the light-emitting surface and/or the rear surface of the light-guiding plate. Therefore, light whose reflective angle is modified by the reflective-angle modified portion reaches the light-emitting surface with an angle of incidence equal to or less than the critical angle after repeating reflection, and so light extracting efficiency can be improved. Accordingly, luminance can be controlled or improved not to reduce in the backlight device and in the LCD apparatus including the backlight device.

As described above, according to embodiments of the backlight device and LCD apparatus of the present invention, luminance can be controlled not to reduce, or can be improved.

BRIEF DESCRIPTION OF THE DRAWINGS

FIG. 3 is a constitutional view schematically showing a section of a relevant part of a backlight device according to an embodiment of the present invention;

FIG. 4 is an explanatory view showing a state of light beams reflecting in a backlight device according to an example of related art;

FIG. 5 is an explanatory view showing a state of light beams reflecting in a backlight device according to an embodiment of the present invention;

FIG. 6 is a constitutional view schematically showing a section of a relevant part of a backlight device according to an embodiment of the present invention; and FIG. 7 is a constitutional view schematically showing a section of a relevant part of a backlight device according to an embodiment of the present invention.

DESCRIPTION OF THE PREFERRED EMBODIMENTS

Hereinafter, embodiments of the present invention will be described, however, the present invention is not limited thereto.

Figure 1:
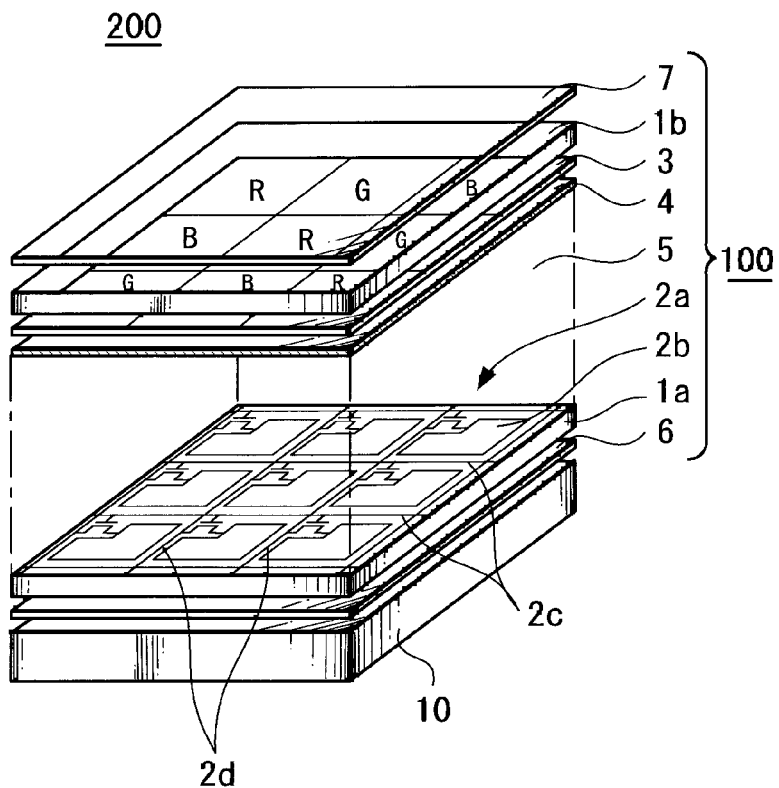
FIG. 1 is an exploded constitutional view schematically showing an LCD apparatus according to an embodiment of the present invention.

First, an example of a transmissive LCD (Liquid Crystal Display) apparatus to which a backlight device according to an embodiment of the present invention is suitably applied is explained referring to the schematic constitutional view of FIG. 1.

As shown in FIG. 1, a transmissive LCD apparatus 200 includes a transmissive LCD panel 100 and a backlight device 10 provided on the rear surface side thereof. Although not shown in the figure, the LCD apparatus 200 may also include: a receiver such as an analogue tuner or a digital tuner that receives a terrestrial wave or satellite wave; a video signal processor and an audio signal processor respectively processing a video signal and an audio signal received by the receiver; an audio signal output portion such as a speaker which outputs the audio signal processed by the audio signal processor; and the like.

An active-matrix LCD apparatus is used in this example, in which a TFT (Thin Film Transistor) 2a to select the pixel and a pixel electrode 2b connected to a drain region of the TFT 2a are formed for each pixel on a first substrate 1a made of glass or the like. Further, a gate bus line 2c connected to a gate electrode of the TFT 2a and a source bus line 2d connected to a source region of the TFT 2a are formed in lattice shape in the boundary portion of each pixel such that each pixel can be connected.

On the other hand, a color filter 3 of three colors of red (R), green (G) and blue (B) is formed alternately for each pixel on a second substrate 1b made of glass or the like, and a common electrode 4 formed in common regarding a plurality of pixels is provided in the upper layer thereof. FIG. 1 shows only nine pixels of 3×3, however, the color filter 3 is provided to display m×n pixels, in actuality. The first substrate 1a and the second substrate 1b are arranged in parallel with a predetermined gap in between such that the pixel electrode 2b and the common electrode 4 are faced to each other. The space between the pixel electrode 2b and the common electrode 4 is sealed with liquid crystal 5 to be held between the liquid crystal orientation films not shown in the figure.

Further, a polarizing plate 6 and a backlight device 10 that emits white light are arranged on the rear surface side of the first substrate 1a, which is the side opposite to the surface where the pixel electrodes 2b are formed. Then, a polarizing plate 7 is arranged on the rear surface side of the second substrate 1b, which is the side opposite to the surface where the common electrode 4 is formed.

Figure 2:
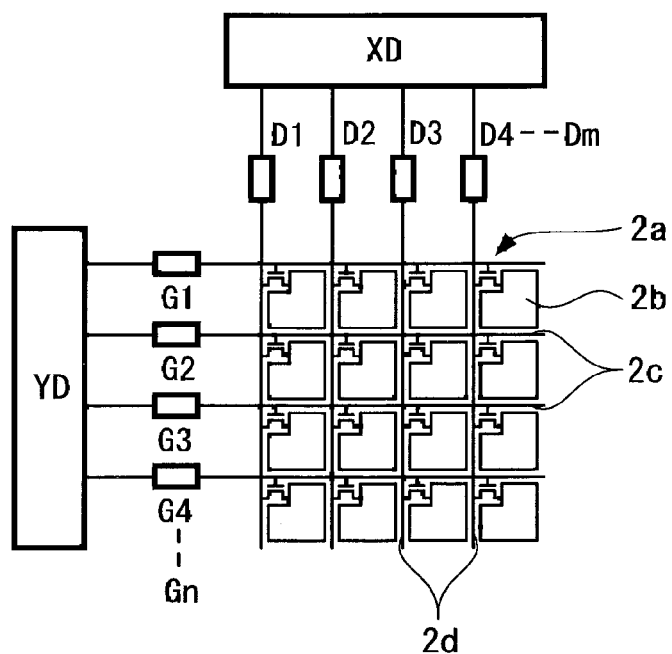
FIG. 2 is a constitutional view schematically showing a relevant part of an LCD apparatus according to an embodiment of the present invention.

FIG. 2 is a schematic constitutional view showing arrangement of a liquid crystal drive electrode and TFT. Although sixteen pixels of 4×4 are shown in FIG. 2, m×n pixels are arranged in actuality. As described above, the TFT 2a and pixel electrode 2b are arranged for each pixel on a surface of the first substrate 1a, and the gate bus line 2c and the source bus line 2d are formed in the shape of a lattice at the boundary portion of respective pixels. Liquid crystal drivers including a X-driver XD and Y-driver YD are arranged at the outer frame portion or the like of a liquid crystal screen, and the gate bus lines 2c are connected to the Y-driver YD through selective circuits G1 to Gn. On the other hand, the source bus lines 2d are connected to the X-driver XD through the selective circuits D1 to Dm.

In accordance with a signal of the gate bus line 2c that is a scanning electrode bus, the TFT 2a that is an active element connects each pixel electrode 2b, which applies an electric field to the liquid crystal 5, to the source bus line 2d which is a data electrode, or disconnects each pixel electrode from the source bus line, and selectively drives the liquid crystal of each pixel. Light emitted from the backlight device 10 and transmitted through the polarizing plate 6 is further transmitted through the liquid crystal 5 whose transmissivity is controlled by the liquid crystal portion selected and driven by the above-described selective circuit. Further, the light through the liquid crystal 5 is transmitted through the color filter 3 of each color and the polarizing plate 7 to form a color image on the polarizing plate 7 side. With this, a liquid crystal display of high image quality, having high contrast and operating at high speed can be obtained.

An example of the LCD apparatus based on the active matrix drive method was explained in the above-described embodiment. However, needless to say, the backlight device and LCD apparatus according to an embodiment of the present invention can be applied to other LCD apparatuses of various drive methods and structures such as an LCD apparatus of a simple matrix drive method and the like.

FIG. 3 is a constitutional view schematically showing a section of a relevant part of the backlight device 10 according to an embodiment of the present invention. As shown in FIG. 3, the backlight device 10 according to an embodiment of the present invention is a direct backlight device in which a light source 21 made of, for example, a light emitting diode (LED) is arranged on the rear surface 30B that is the side opposite to a light-emitting surface 30A of a light-guiding plate 30. Further, a reflective-angle modified portion 35 to modify a reflective angle of light emitted from the light source 21 is provided on the light-emitting surface 30A and/or the rear surface 30B, in this example, on the light-emitting surface 30A.

Colorless and transparent resin, for example, an acrylic resin that has light transmissivity in a band of wavelength used can be used as a material for the light-guiding plate 30.

Cylindrical concave portions 31 each of which houses the light source 21, for example, an LED are provided at equal intervals in lines on the rear surface 30B opposite to the light-emitting surface 30A. A red LED 21R, green LED 21G and blue LED 21B are individually arranged in the concave portions 31 in this order to be assembled into the light-guiding plate 30. FIG. 3 shows a section where the LEDs 21 are arranged in a row, but the LEDs are similarly provided in rows in the direction vertical to the paper surface of FIG. 3. Accordingly, the LEDs 21 are arranged to make a plane constituting a planar light source as a whole.

Further, reflective films 32 and 33 made of a reflective sheet or the like are respectively attached through, for example, adhesive to the rear surface 30B and to the side surfaces 30C of the light-guiding plate 30, except for the light-emitting surface 30A.

A diffusion plate 41 that diffuses light emitted from the light-guiding plate 30 is provided above the light-guiding plate 30A, in contact with the light-guiding plate 30 in this example. Note that, although not shown in the figure, in order to convert planar light emitted from the backlight device 10 into illumination light having an optimum optical characteristic for the LCD panel 100, an optical sheet group may be provided on the upper surface side or on the lower surface side of the diffusion plate 41. The optical sheet group may include sheets having: function of resolving incident light into the orthogonal polarized light components, function of compensating the phase difference of the light wave to obtain a wider field of view and to prevent coloration, function of diffusing incident light, function of improving luminance, and the like. Specifically, the optical sheet group may include a diffusion sheet, a prism sheets a polarized-light converting sheet and the like, for example.

Further, the diffusion plate 41 is in contact with the light-guiding plate 30 in the example shown in the figure, however, a gap may be provided between those plates.

In the backlight device 10 having the above-described structure, light in which red light, green light and blue light were mixed in the light-guiding plate 30 is further dispersed in the diffusion plate 41 and is incident on the LCD panel 100 as planar white light having uniform luminance.

Emission angle distribution of light emitted from the LED 21 can be adjusted by a lens of the LED 21. Particularly, when a sidelight LED in which light is emitted in the side surface direction of the LED is used, light beams can be guided across a wide area in the light-guiding plate 30.

In the sidelight LED 21, though not explained in detail, a light-emitting body such as a light-emitting element is individually held by a resin holder and a pair of terminals protrude from the resin holder. An optical component with which light emitted from the light source is radiated from the side surface is provided in each of LEDs 21, and so the LEDs have directivity in which main components of the emitted light is radiated in the outer circumferential direction of the light-emitting body.

FIG. 4 is a constitutional view schematically showing a section of a relevant part of a backlight device of related art. In FIG. 4, the same symbols are given to portions corresponding to those in FIG. 3, and redundant explanations thereof are omitted. In the backlight device of related art, the light-guiding plate 30 is not particularly processed and a reflective film, a diffusion reflective sheet and the like are provided on the rear surface 30B and side surfaces 30C.

In this case, when the light-guiding plate 30 is made of acrylic resin, a total-reflection critical angle is approximately 42°.

As shown in FIG. 4, in the backlight device 10 of related art, reflective angles of light beams emitted from the light source 21 such as an LED are not modified in the light-guiding plate 30. Therefore, light incident on the interface between the light-guiding plate and the outside with an angle larger than the critical angle repeats regular reflection. As shown with arrows L11, L12 . . . , L21, L22, . . . L26, L27, for example, light beams reflect on the light-emitting surface 30A of the light-guiding plate 30 without the reflective angles being modified. Further, the light beams repeatedly reflect on the side surfaces 30C and the rear surface 30B thereof by the reflective films 32 and 33 and so on, respectively. As shown with an arrow L31 of a broken line, part of light with an angle smaller than the critical angle is incident on the light-emitting surface 30A and is emitted to the outside, as shown with an arrow L32. In addition, part of light that repeats regular reflection is emitted to the outside to some extent due to some irregular reflection components.

However, in the backlight device 10 of related art as described above, certain part of light beams emitted from the light source 21 such as an LED continuously reflect with an angle larger than the total-reflection critical angle and may not be emitted to the outside from the light-guiding plate 30.

Therefore, according to an embodiment of the present invention, a reflective-angle modified portion 35 is provided on a part of the surfaces of the light-guiding plate 30, for example, on the light-emitting surface 30A. The reflective-angle modified portion 35 may be formed by a sandblast method, in which a surface is treated with the sandblast of approximately 80 meshes to provide minute concavity and convexity, namely, a surface is made rough to modify the reflective angle of light beams incident on this surface after emitted from the light source 21. FIG. 5 shows the above-described state. In FIG. 5, the same symbols are given to portions corresponding to those in FIGS. 3 and 4, and redundant explanations thereof are omitted. In FIG. 5, light emitted from the light source 21 is incident on the reflective-angle modified portion 35 as shown with an arrow La2 after reflecting on the rear surface 30B as shown with an arrow La1. Or, light emitted from the light source 21 is directly incident on the reflective-angle modified portion 35 as shown with an arrow Lb1. In addition, light emitted from the light source 21 may be incident on the reflective-angle modified portion 35 of the light-emitting surface 30A after reflected on the surface of adjacent light sources 21 not shown in the figure.

With the reflective angle being modified on the surface, light beams are incident on the light-emitting surface 30A as shown with arrows La3 to La5 and arrows Lb2 and Lb3 each having an angle different from the previous angle of incidence on the light-emitting surface 30A. Hence, when the angle becomes equal to or smaller than the critical angle, the light beams can be emitted to the outside as shown with arrows La6 and Lb4 of broken lines. Therefore, in the backlight device 10 according to an embodiment of the present invention, light beams repeatedly reflected within the light-guiding plate 30 can efficiently be extracted to the outside.

As a practice example, a backlight device 10 according to an embodiment of the present invention was manufactured. In this example, the reflective-angle modified portion 35 made of minute concavity and convexity was provided on the light-emitting surface 30A by a sandblast method, and regular reflective films were provided on the rear surface 30B and the side surfaces 30C. In this case, the reflective-angle modified portion 35 made of a concave-convex structure was made on the entire light-emitting surface 30A. Specifically, in this case, the reflective-angle modified portion 35 of the concave-convex structure was formed with no space remained on the light-emitting surface 30A and the concave-convex structure has approximately uniform distribution within the surface. With this backlight device 10, luminance on the entire light-emitting surface 30A was improved by approximately 10% as compared with a backlight device of related art in which the light-emitting surface 30A is flat and regular reflective films are provided on the rear surface 30B and the side surfaces 30C.

Note that, the reflective-angle modified portion 35 can be made of a press-molded concave-convex structure other than the minute concave-convex structure made by the above-described sandblast method or the like. Further, the cross section may have concavity and convexity at random with dispersion in shape, or may be regularly shaped.

In order to modify the reflective angle of light further uniformly on the light-emitting surface 30A and ultimately to obtain light as much as possible on the outside, it is desirable that the reflective-angle modified portion 35 be formed on the whole light-emitting surface 30A. However, if there is a necessity for a part of the surface to remain planarized due to a reason resulted from the structure of the other parts, the reflective-angle modified portion may be formed across as much area as possible to obtain effectiveness according to an embodiment of the present invention.

Further, although the minute concave-convex structure may be formed dispersedly, it is desirable that the concave-convex structure be formed across as wide area as possible and be distributed uniformly as much as possible so that luminance is prevented from being uneven.

Further, the reflective-angle modified portion 35 may be provided not only on the light-emitting surface 30A but also on the rear surface 30B as shown in FIG. 6, and may be provided only on the rear surface 30B, although not shown in the figure.

Furthermore, as shown in FIG. 7, the reflective-angle modified portion 35 may be provided on the side surfaces 30C in addition to being provided on the light-emitting surface 30A and the rear surface 30B. In FIGS. 6 and 7, the same symbols are given to portions corresponding to those in FIG. 3 and redundant explanations thereof are omitted.

As described above, when the reflective-angle modified portion 35 is provided on the other surfaces than the light-emitting surface 30A, light extracting efficiency and luminance can further be improved.

As heretofore described, according to an embodiment of the present invention, light extracting efficiency can be improved in the direct backlight device in which the light source 21 is provided on the rear surface of the light-guiding plate 30. Therefore, luminance can be prevented from lowering or can be improved in the backlight device and the LCD apparatus using the same.

In the case where the present invention is applied to a sidelight light-emitting diode that uses an LED as a light source which emits light in the side surface direction, particularly light can be extracted efficiently and luminance can be improved.

Furthermore, according to an embodiment of the present invention, with the backlight device of the above-described structure being used, an LCD apparatus capable of displaying with high luminance compared with related art can be provided.

Particularly, when the backlight device according to an embodiment of the present invention is used, light extracting efficiency can be improved without the thickness of the light-guiding plate being made large, and so the backlight device can be made thin. Accordingly, a direct backlight device capable of display with high luminance and an LCD apparatus including the backlight device can be provided with a similar thickness and luminance to a backlight device and LCD apparatus that use CCFL (Cold Cathode Fluorescent Lamp).

Note that the present invention is not limited to the above-described embodiments, and various modification and alteration can be made with respect to material composition of the light-guiding plate, a structure of optical components in the vicinity of the light-guiding plate, kinds and arrangement of an LED, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight device comprising:
   a light guiding plate having a light-emitting surface, a rear surface facing in a direction opposite that of said light-emitting surface, and side surfaces interconnecting the light-emitting surface and the rear surface;
   one or more concave portions formed into said rear surface and extending toward said light-emitting surface; and
   a light-emitting diode light source arranged within each of said one or more concave portions,
   wherein,
      at least (i) said light-emitting surface, (ii) said side surfaces of said light-guiding plate, and (iii) said rear surface of the light-guiding plate are configured as a reflective-angle modified portion comprising a rough reflective surface with minute convexities and concavities distributed uniformly across a whole surface of (i) said light-emitting surface, (ii) said side surfaces of said light-guiding plate, and (iii) said rear surface of the light-guiding plate but excludes surfaces of the one or more concave portions, wherein said reflective-angle modified portion modifies a reflective angle of light emitted from said light source so that light within the light-guiding plate having an angle of incidence with respect to the light emitting surface that is greater than a critical angle is reflected back from the light-emitting surface while light within the light-guiding plate having an angle of incidence with respect to the light-emitting surface that is equal to or smaller than the critical angle transmits through the light-emitting surface, the critical angle being that angle at which light totally reflects from said light-emitting surface, wherein the reflective-angle modified portion modifies light incident on the light-emitting surface such that light beams incident on the light-emitting surface have an angle different from a previous angle of incidence on the light-emitting surface; and
   wherein the backlight device further includes a reflective film on each of the side surfaces and the rear surface that is operable to reflect light transmitted through the rough reflective surface.

2. A backlight device according to claim 1, wherein said minute convexities and concavities are as would result from directly sand blasting said light guiding plate with particles of 80 mesh size or smaller.

3. A backlight device according to claim 2, wherein said minute convexities and concavities are formed dispersedly.

4. A backlight device according to claim 2, wherein said side surfaces of said light-guiding plate are surfaces other than said light emitting surface and said rear surface.

5. The backlight device of claim 1, wherein the light guiding plate is acrylic resin, and the critical angle is approximately 42°.

6. The backlight device of claim 5, wherein the one or more concave portions comprises a plurality of concave portions and the light-emitting diode light sources include a red LED, a green LED, and a blue LED individually arranged in the plurality of concave portions in this order.

7. The backlight device of claim 1, wherein the reflective film on the rear surface of the light-guiding plate extends at least partially over the one or more concave portions formed in the rear surface.

8. The backlight device of claim 1, wherein the one or more concave portions formed in the rear surface extend only partially through the light guiding plate and toward said light-emitting surface.

9. The backlight device of claim 1, wherein at least one of the plurality of reflective sheets at least partially closes at least one of the one or more concave portions.

10. The backlight device of claim 1, further comprising a lens configured to adjust an emission angle of light emitted from the light-emitting diode light source.

11. The backlight device of claim 10, further comprising a diffusion plate configured to alter an optical characteristic of light emitted from the light-guiding plate.

12. A liquid crystal display apparatus comprising:
a transmissive liquid crystal display panel; and
a backlight device illuminating said liquid crystal display panel from a rear surface side thereof,
wherein,
said backlight device includes (a) a light-guiding plate having a flat light-emitting surface, a flat rear surface facing in a direction opposite said light-emitting surface, and side surfaces interconnecting the light-emitting surface and the rear surface, (b) one or more concave portions formed into said rear surface and extending toward said light-emitting surface, and (c) a light-emitting diode light source positioned within each of said one or more concave portions, at least (i) said light-emitting surface, (ii) said side surfaces of said light-guiding plate, and (iii) said rear surface of the light-guiding plate comprise a reflective-angle modified portion comprising a rough reflective surface with minute convexities and concavities distributed uniformly across a whole surface of (i) said light-emitting surface, (ii) said side surfaces of said light-guiding plate, and (iii) said rear surface of the light-guiding plate but excludes surfaces of the one or more concave portions, wherein said reflective-angle modified portion modifies a reflective angle of light emitted from said light source so that light within the light-guiding plate having an angle of incidence with respect to the light emitting surface that is greater than a critical angle is reflected back from the light-emitting surface while light within the light-guiding plate having an angle of incidence with respect to the light-emitting surface that is equal to or smaller than the critical angle transmits through the light-emitting surface, the critical angle being that angle at which light totally reflects from said light-emitting surface, wherein the reflective-angle modified portion modifies light incident on the light-emitting surface such that light beams incident on the light-emitting surface have an angle different from a previous angle of incidence on the light-emitting surface; and
wherein the backlight device further includes a reflective film on each of the side surfaces and the rear surface that is operable to reflect light transmitted through the rough reflective surface.

13. The liquid crystal display apparatus according to claim 12, wherein said minute convexities and concavities are result from directly sand blasting said light guiding plate with particles of 80 mesh size or smaller.

14. The liquid crystal display apparatus according to claim 13, wherein said minute convexities and concavities are formed dispersedly.

15. The liquid crystal display apparatus according to claim 12, wherein said side surfaces of said light-guiding plate are surfaces other than said light-emitting surface and said rear surface.

16. The liquid crystal display apparatus of claim 12, wherein the light guiding plate is acrylic resin, and the critical angle is approximately 42°.

17. The liquid crystal display apparatus of claim 16, wherein the one or more concave portions comprises a plurality of concave portions and the light-emitting diode light sources include a red LED, a green LED, and a blue LED individually arranged in the plurality of concave portions in this order.

18. The liquid crystal display apparatus according to claim 12, wherein the reflective film on the rear surface of the light-guiding plate extends at least partially over the one or more concave portions formed into the rear surface.

19. The liquid crystal display apparatus according to claim 12, wherein the one or more concave portions formed in the rear surface extend only partially through the light guiding plate and toward said light-emitting surface.

* * * * *